DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 24, 1970

872 O.G. 1051

T872,005

NOVEL CATALYST SYSTEM AND OLEFIN POLYMERIZATION THEREWITH

John A. Price, Swarthmore, Pa. (American Viscose Div., FMC Corporation, Post Road, Marcus Hook, Pa. 19061)

Continuation-in-part of application Ser. No. 442,478, Mar. 24, 1965. This application July 22, 1969, Ser. No. 843,857

Int. Cl. C08f *1/56, 3/10*

U.S. Cl. 260—93.7

No Drawing. 8 Pages Specification

Propylene or higher alpha-olefin is polymerized to predominantly crystalline high molecular weight polymers in the presence of an inert hydrocarbon diluent and a catalyst system consisting essentially of predominantly amorphous titanium trichloride, an alkali metal hydrocarbon compound, and either aluminum trichloride or aluminum tri-iodide, the mol ratios of Al to Ti and alkali metal to Al being in the range between 1:10 and 10:1. Usually the mol ratio of Al to Ti is in the range between 1:5 and 5:1, preferably in the range between 1:2 and 2:1. The mol ratio of alkali metal to Al is usually in the range between 2:1 and 5:1, preferably in the range between 5:2 and 7:2. The alkali metal hydrocarbon compound contains no olefinic unsaturation, and may be for example a Li, Na or K alkyl, aryl or cycloalkyl. Alkali metal alkyls having a chain length of 1 to 8 carbon atoms are generally used; lower alkyl Li compounds containing 2 to 5 carbon atoms are preferred.